(12) United States Patent
Cheng

(10) Patent No.: US 7,761,971 B2
(45) Date of Patent: Jul. 27, 2010

(54) COOKWARE WITH FLAT INTERIOR SURFACE

(75) Inventor: Stanley Kin Sui Cheng, Vallejo, CA (US)

(73) Assignee: Meyer Intellectual Properties Limited (VG)

( * ) Notice: Subject to any disclaimer, the term of this patent is extended or adjusted under 35 U.S.C. 154(b) by 1071 days.

(21) Appl. No.: 11/210,317

(22) Filed: Aug. 24, 2005

(65) Prior Publication Data

US 2007/0051731 A1    Mar. 8, 2007

(51) Int. Cl.
    B21D 39/00    (2006.01)
    B23P 11/00    (2006.01)
(52) U.S. Cl. .................. 29/505; 72/379.4; 72/379.6
(58) Field of Classification Search ............. 29/505; 220/573.1; 219/621, 121.64; 72/379.2, 379.4, 72/379.6
    See application file for complete search history.

(56) References Cited

U.S. PATENT DOCUMENTS 3,173,202 A * 3/1965 Farber ............... 228/173.2
5,240,137 A * 8/1993 Figueras ............ 220/626
5,487,329 A * 1/1996 Fissler .............. 99/403
5,532,461 A * 7/1996 Crummenauer et al. ..... 219/621
6,782,599 B1 * 8/2004 Sollo ................ 29/521

FOREIGN PATENT DOCUMENTS

WO    WO 01/87514    * 11/2001

* cited by examiner

Primary Examiner—David P Bryant
Assistant Examiner—Christopher M Koehler
(74) Attorney, Agent, or Firm—Edward S. Sherman

(57) ABSTRACT

An article of cookware is fabricated by a combination of a deep drawing a metal sheet or laminate to form a fluid retaining preform and then using an impact bonding process to attach a medallion to the outside bottom surface of preform. In another aspect, the impact bonding process alternatively provides a means to achieve a slightly concave exterior bottom surface, while maintaining a substantially flat and/or slightly concave interior bottom surface to minimize the use of cooking oil.

14 Claims, 5 Drawing Sheets

PRIOR ART

COOKWARE WITH FLAT INTERIOR SURFACE

CROSS REFERENCE TO RELATED APPLICATIONS None

BACKGROUND OF INVENTION

The present invention relates to an improved article of cookware, in particular a pot or pan having a flat interior surface.

Cookware article such as pots and pans are routinely formed in a process that provides for the exterior bottom surface to have a concave shape, so that the pan rests on the periphery of the exterior bottom surface when disposed on a flat planar surface. This precludes the pots from turning or spinning, as would occur if the bottom where slightly convex so that the pan was supported by a small point or area at the center of the bottom surface.

However, fabricating methods that create a concave outer exterior surface, also create a convex interior surface. Although consumer are largely used to a slightly convex interior surface, it is undesirable if one is trying to minimize the use of cooking oil. Oil poured into the center will run toward the interior edges of the pan, thus a larger quantity of oil is required to evenly cover the bottom interior of the pan as compared with a truly flat interior surface.

It is a first objective of the invention to provide an article of cookware that will not spin when placed on a planar surface, but that can be used to successfully used to cook foods with a minimum quantity of cooking oil It is therefore a first object of the present invention to provide a cooking vessel having a concave exterior bottom surface, while maintaining a substantially flat interior bottom surface.

It is a further objective of the invention to provide a cooking vessel having a concave exterior bottom surface, while providing a concave interior surface.

It is another object of the invention to provide an efficient and economical process for manufacturing a cooking vessel having a concave exterior bottom surface, while maintaining a substantially flat interior bottom surface or a concave interior surface.

SUMMARY OF INVENTION

In the present invention, the first object is achieved by a process of a forming a cooking vessel in multiple steps that comprises forming a pan shape out of a flat metal sheet or laminate and to then impart the final shape to the pan by impact bonding.

Other objectives of the invention are met by utilizing during the process of impact bonding an interior mating die having a substantially planar surface or a slightly convex surface to impart a slightly concave surface to the interior of the article of cookware.

A second aspect of the invention is characterized in that the above process permits the addition of decorative and protective features to the exterior bottom of the pan.

Accordingly, in such articles of cookware the cooking oil does not initially run to the bottom edges of the pan, but more uniformly cover the central area of the bottom cooking surface.

The above and other objects, effects, features, and advantages of the present invention will become more apparent from the following description of the embodiments thereof taken in conjunction with the accompanying drawings.

DETAILED DESCRIPTION

Figure 1:
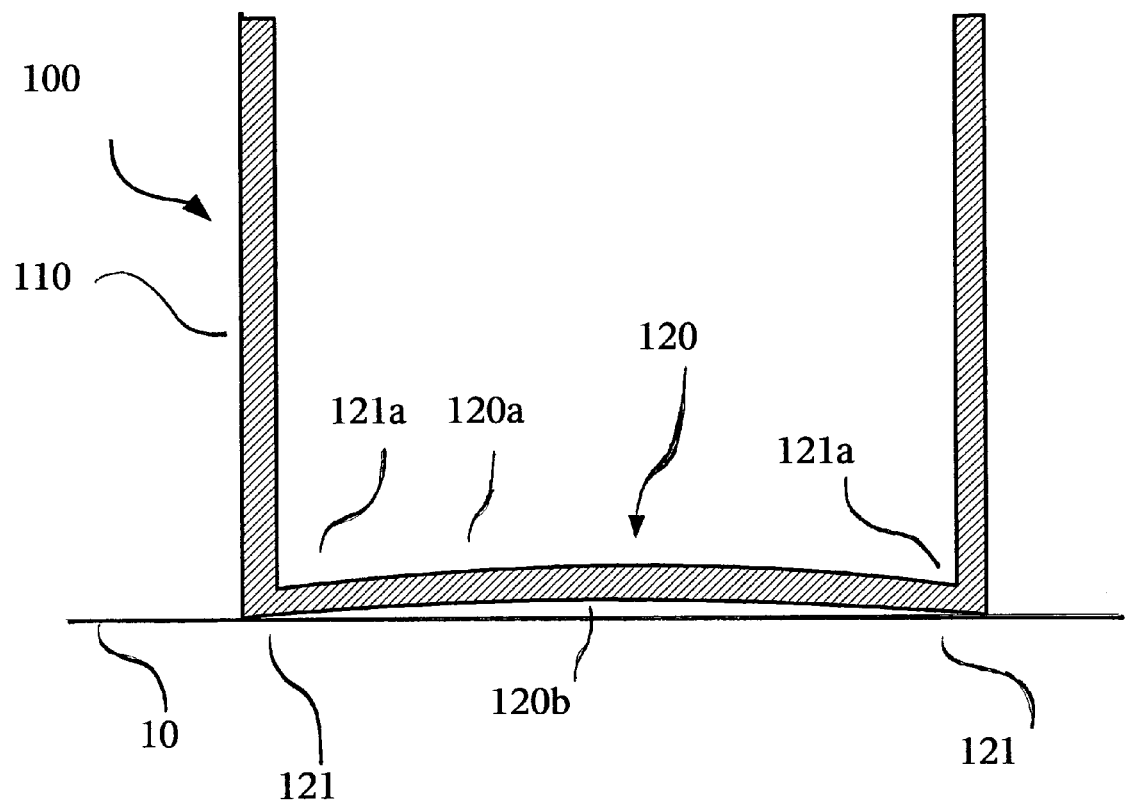
FIG. 1 is a cross-sectional elevation view of prior art cookware exaggerating the shape of the pan bottom.

Referring to FIGS. 2 through 7, wherein like reference numerals refer to like components in the various views, there is illustrated therein a new and improved article of cookware, generally denominated 200 herein.

FIG. 1 illustrates a prior art article of cookware 100. The article 100 is optionally a pan or pot, depending on the relative diameter of the bottom 120 to the height of the surrounding and substantially upright sidewall 110, which together form a fluid containing vessel. The article 100 has an inner bottom cooking surface 120a which receives foodstuffs, cooking oil and the like, whereas the outer bottom cooking surface 120b rests on a table, heating element, burner grid and the like. Accordingly, the article of cookware 100 is shown in FIG. 1 as resting on surface 10. It is desirable that the article of cookware 100 rest firmly on a planar surface and not spin or otherwise move when foodstuff inside the article 100 are manipulated, primary by stirring. Accordingly, the common industrial practice is to avoid surface 120b from being convex outward, that is having its lowest point at or near the center, and more preferably to form surface 120b such that is slightly concave, as shown in FIG. 1, with respect to the resting surface 10. In this preferred form, shown with an exaggerated vertical dimension in FIG. 1, the article of cookware contacts the resting surface 10 only at the perimeter of the bottom surface, 121. Forming the article of cookware with such a concave bottom surface results in the article being more stable on the resting surface 10, as the greater contact provides proportionately more frictional resistance to rotation or other movement. Further, the concave surface in a manner strengthens the bottom of the article of cookware, making it less likely to be deformed from wear and use into a convex shape, which would be especially undesirable.

However, the article of cookware 100 in FIG. 1 has a disadvantage. The manufacturing process used to form article 100 to deliberately render surface 120b slightly concave also results in the inner bottom surface 120a having a matching shape and being slightly convex with respect to the interior thereof. Thus, when oils or other cooking fluids are initially added to the article of cookware 100 they tend to flow toward the perimeter of the interior cooking surface 121a. Therefore, the cook will generally tend deploy at least enough butter, cooking oil or the like to entirely coat the inner cooking surface 120a. This is especially problematic for persons trying to restrict their use and intake of butter, oils and fats in cooking, as they would prefer to use the least amount of oil possible to cover the cooking surface, and thus avoid the absorption of larger quantities of butter or oil into the food during cooking.

Figure 2:
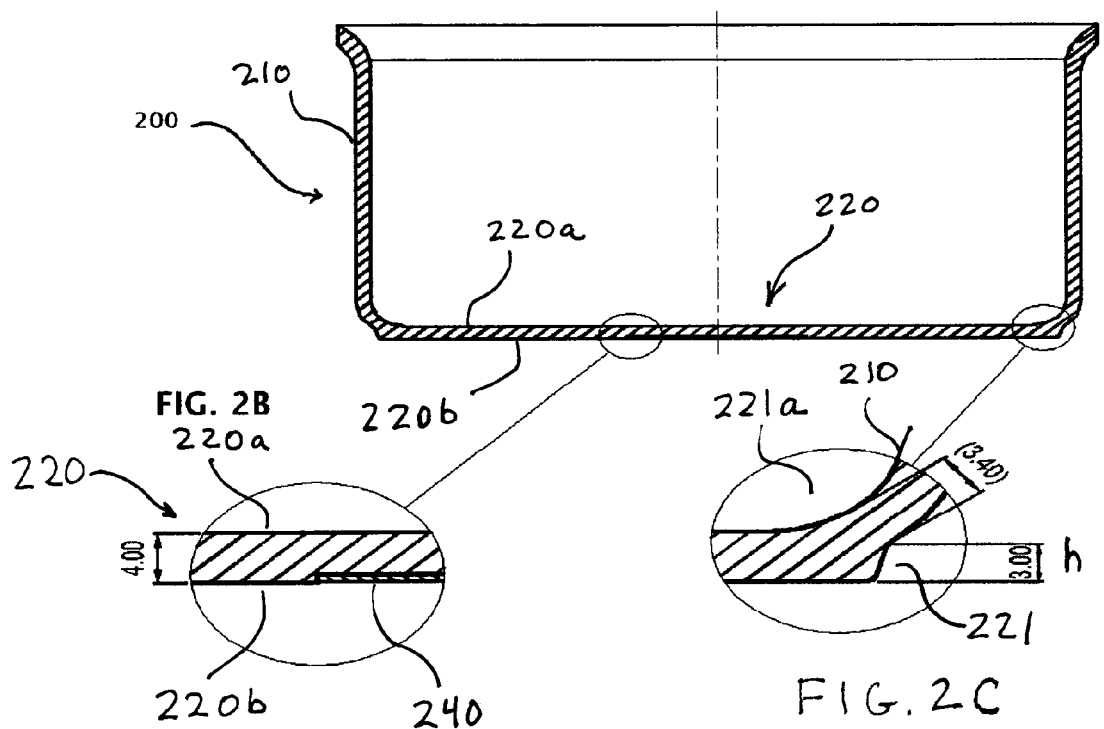
FIG. 2A is a cross-sectional elevation view of one embodiment of the invention.
FIG. 2B is a magnified view of a portion of FIG. 2A.
FIG. 2C is a magnified view of a different portion of FIG. 2A.

In accordance with the present invention, FIG. 2 illustrates a first embodiment of an improved article of cookware 200 that satisfies the need to have a stable article of cookware, yet minimize the use of fats and oils in cooking, and hence thier consumption. The article of cookware 200 has a substantially upright surrounding wall 210 connected to the substantially circular bottom 220 to form a fluid retaining vessel. The article 200 is optionally a pan or pot depending on the diameter of the bottom cooking surface 220 relative to the height of sidewall 210. The article 200 has a substantially planar interior bottom surface 220a which receives foodstuffs, cooking oil and the like, whereas the outer bottom surface 220b rests on a table, heating element, burner grid and the like. As in the article of FIG. 1, outer bottom surface 220b is slightly concave with respect to the exterior. However, the inner cooking surface 220b is substantially flat or planar. Such an article of cookware is achieved through the processes described below in more detail with reference to FIG. 3, 4 and 5.

The article of cookware 200 has the advantage that the minimum quantity of oil to coat the inner cooking surface will depend on the flow characteristic of the oil, as determined by its viscosity and wet ability on the inner coking surface, rather than the degree of convexity, permitting the use of less cooking oil than would be required with the prior art article of 100 shown in FIG. 1. Further, the article of cookware 200 is more conducive to using expensive and exotic cooking oil more as a flavoring ingredient, as less will be required to provide a heat transfer medium or to prevent foodstuff from sticking to the inner cooking surface In another aspect of the invention, shown enlarged in a magnified view in FIG. 2, article of cookware 200 has a medallion 240 embedded in the center of the outer cooking surface 220b. The medallion 240 is used to provide brand or other information of use to the consumer, as it may be embossed with alphanumeric text. Alternatively, in the more preferred embodiments the medallion is made of a different material or metal than the materials that surrounds it in outer cooking surface 220b, provides a decorative variation to the cookware. However, the use of medallion need not be purely decorative, as the color, texture or pattern of the medallion can communicate to the user useful information about the pot, such as the composition. For example, a laminated article of cookware having a cooper core might deploy a copper colored medallion.

Note also, that in this preferred embodiment, the perimeter 221a of the substantially planar interior bottom surface 220a, shown enlarged in the magnified view in FIG. 2C, has a rounded surface in the transition to surrounding upright wall surface 210. Further, the exterior bottom surface is formed with bevel or footing 221 to provide a secure resting surface, obviating any tending for the article of cookware to laterally wobble, as might occur if the exterior perimeter had the safe rounded profile as the inner cooking surface perimeter.

The bottom 220 of the article of cookware 200 preferably has a thickness of about 4 mm, whereas the surrounding sidewall 210 preferably have the same or a slightly lower thickness, such as about 3.4 mm. Further, the height of the bevel 221 in FIG. 2C, labeled h, is about 3 mm.

Figure 3:
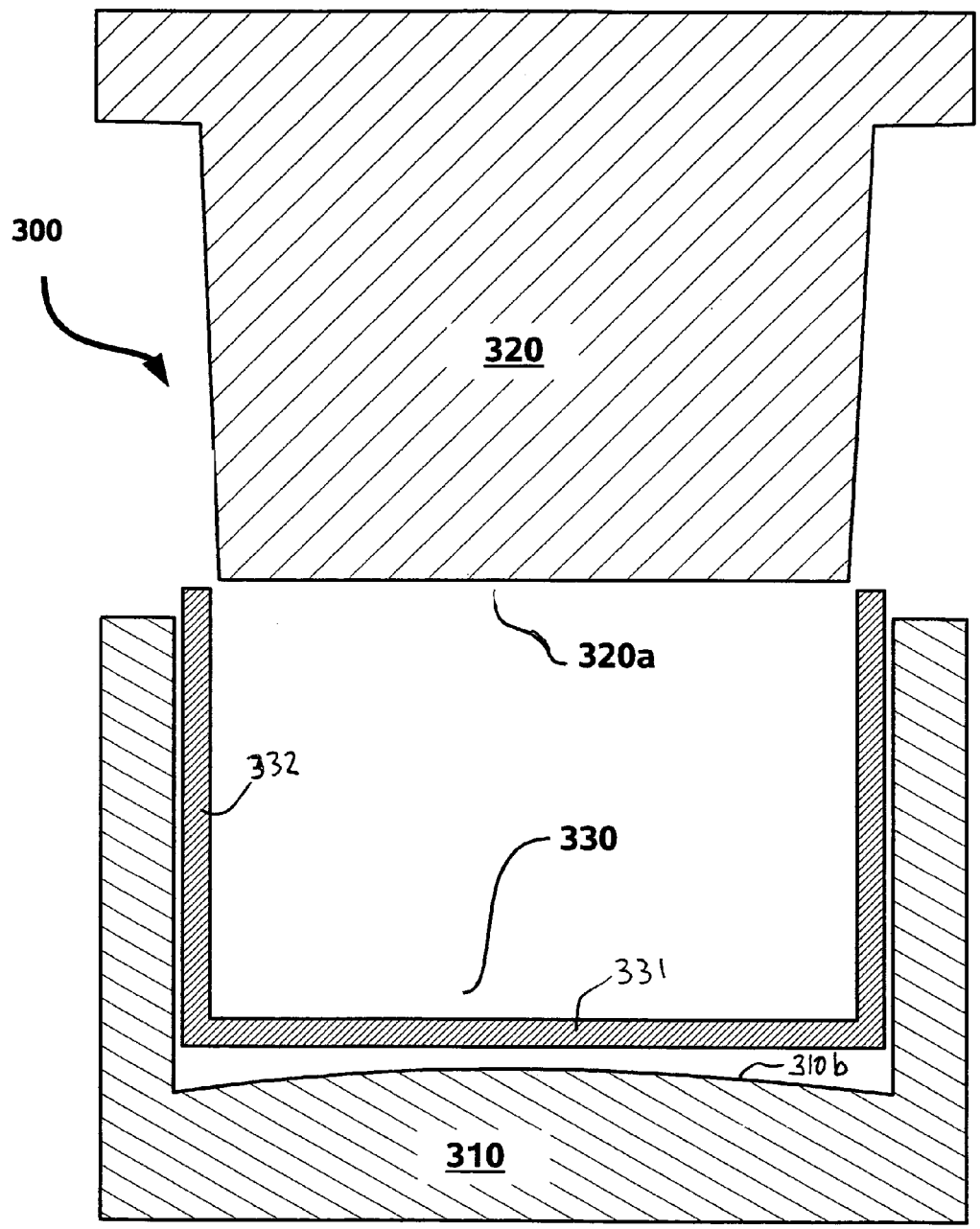
FIG. 3 is a cross-sectional elevation view of the tooling and work piece deployed to form a second embodiment of the invention.

FIG. 3 illustrates a first embodiment for forming an article of cookware comparable to that shown in FIG. 2, using tooling system 300. The work piece is a fluid retaining preform 330 that is formed in the first step of the process Thus, like the completed article of cookware shown in FIG. 2, the preform 330 has a bottom surface 331 and surrounding sides 332 extending upward therefrom to form a fluid containing vessel with an interior surface and an exterior surface. Preform 330 may be fabricated by deforming a substantially planar sheet of metal. The planar metal sheet, when used to fabricate preform 330, may be homogenous, consisting of a single layer of one material, or be a laminate of different layers of different materials. The first step in the fabrication process can deploy any method to make perform 330, either a conventional drawing process or casting of molten metal to form preform 330.

The next step of the process uses an impact bonding press to impart the final shape to the pan. Thus, as shown in FIG. 3, preform work piece 330 is inserted between dies of an impact bonding press that comprises an upper tooling member 320 and a lower tooling member 310. The upper portion exterior surface 310b of the lower tooling member 310 has a convex shape, and the lower interior surface 320a of the upper tooling member 320 has a substantially planar shape.

Thus, in the next step in the process, impacting the preform 330 between the dies upper and lower tooling members 320 and 310 imparts the shape of the respective tooling member to the exterior and interior surfaces of the preform 330, as well as reshaping the contour of the upward extend walls, if desired. The exterior surface 320a of the upper tooling member 320 imparts the interior shape, including the substantially planar interior bottom surface 220a of the completed cookware article 200 in FIG. 2. The exterior surface 310b of the lower tooling member 310 imparts the exterior shape to preform 330, resulting in the concave exterior bottom surface 220b of the completed cookware article 200 of FIG. 2. In additional conventional steps of cookware fabrication one or more side handles are added to the article of cookware 200.

Figure 4:
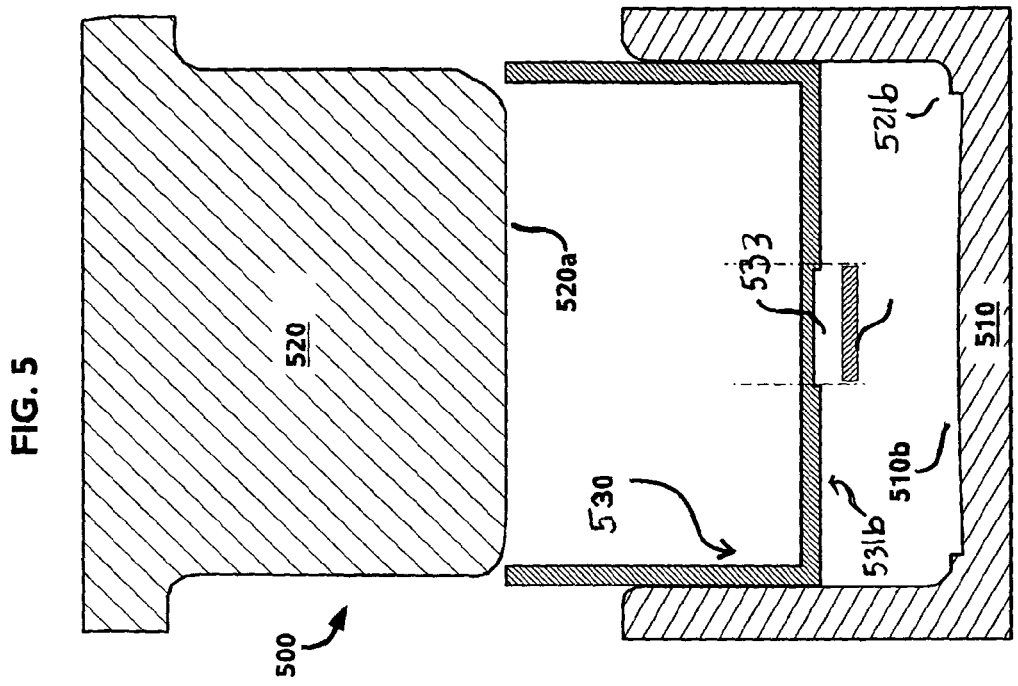
FIG. 4 is a cross-sectional elevation view of the tooling and work piece deployed to form another embodiment of invention, comparable to that shown in FIG. 2.
Figure 5:
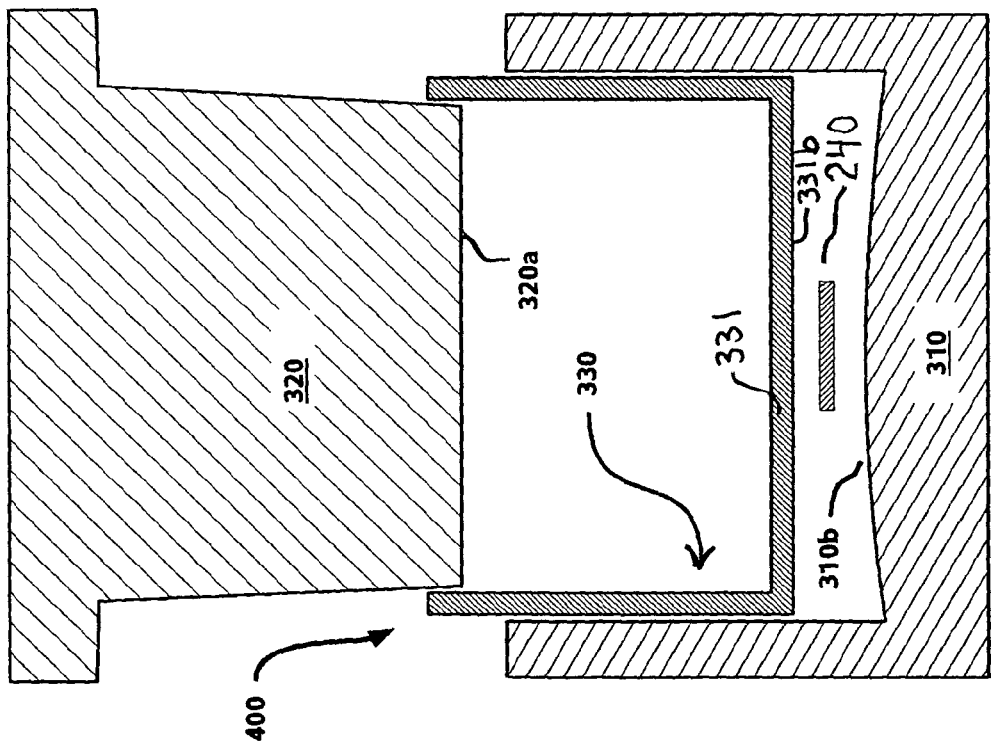
FIG. 5 is a cross-sectional elevation view of the tooling and work piece deployed in an alternative method to form the article shown in FIG. 2.

In a further embodiment of the invention, the process described above is used to bond a medallion in the exterior bottom surface as illustrated in FIG. 4 and FIG. 5. The medallion thickness is between about 0.4 to 2 mm, but is preferably about 1 mm.

Thus, the embodiment illustrated in FIG. 4 provides one method of forming the article of cookware shown in FIG. 2 using tooling system 400. As in FIG. 3, the work piece is the fluid retaining preform 330 that is formed in the first step of the process by deforming a substantially planar sheet of metal or casting.

The next step of the process uses an impact bonding press to impart the final shape to the cookware article. Thus, as shown in FIG. 3, work piece preform 330 is inserted in the die of an impact bonding press that comprises an upper tooling member 320 and a lower tooling member 310.The upper portion exterior surface 310b of the lower tooling member 310 has a convex shape, and the lower interior surface 320a of the upper tooling member 320 has a substantially planar shape. A coin or medallion 240 is inserted between surface 310b of the lower tooling member 310 and the bottom surface 331b of the perform 330.

Thus, in the next step in the process, impacting the preform 330 between the dies upper and lower tooling members 320 and 310 impart the shape of the respective tooling member to the exterior and interior surface of the perform, as well as reshaping the contour of the upward extend walls, if desired. The exterior surface 320a of the upper tooling member 320 imparts the interior shape resulting in the substantially planar interior bottom surface 220a of FIG. 2 in the completed cookware article 200. The upper exterior surface 310b of the lower tooling member 310 imparts the exterior shape to preform 330, resulting in the concave exterior bottom surface 220b, while simultaneously embedding the coin or medallion 240 in the exterior bottom surface 220b of the article of cookware 200, shown in FIG. 2.

FIG. 5 illustrates another embodiment of the process for embedding a medallion 240 in the exterior bottom surface 531b of perform 530, using tooling system 500. Work piece 530 is a fluid retaining perform that is formed in the first step of the process by deforming a substantially planar sheet of metal. However, preform 530 has a circular cut out 533 in the exterior bottom surface 531b. The coin or medallion 240 is inserted between surface 510b of the lower forming die or tool 510 and the pocket 533 in the exterior bottom surface 531b of the perform 530. At least a portion of the coin or medallion 240 is intended to fit into the cut out 533.

The depth of cut out 533 will very with the thickness of medallion 240, but is generally less than half the thickness of the bottom of the cooking vessel, and up to about the thickness of the medallion. More specifically, such a cut out might have a depth of between about 0.2 mm to about 2 mm. As shown in FIG. 5, the lower tooling member 510 has a perimeter profile 521b on surface 510b to create the beveled perimeter 221 shown in FIG. 2C. The upper tooling member 520 has a substantially planar bottom surface 520a.

Thus, in the next step in the process, impacting the preform 530 between upper and lower tooling members 520 and 510 imparts the interior and exterior shape of the die to the preform while simultaneously embedding the coin or medallion 240 in the exterior bottom surface 220b of the article of cookware 200, as shown in FIG. 2.

Figure 6:
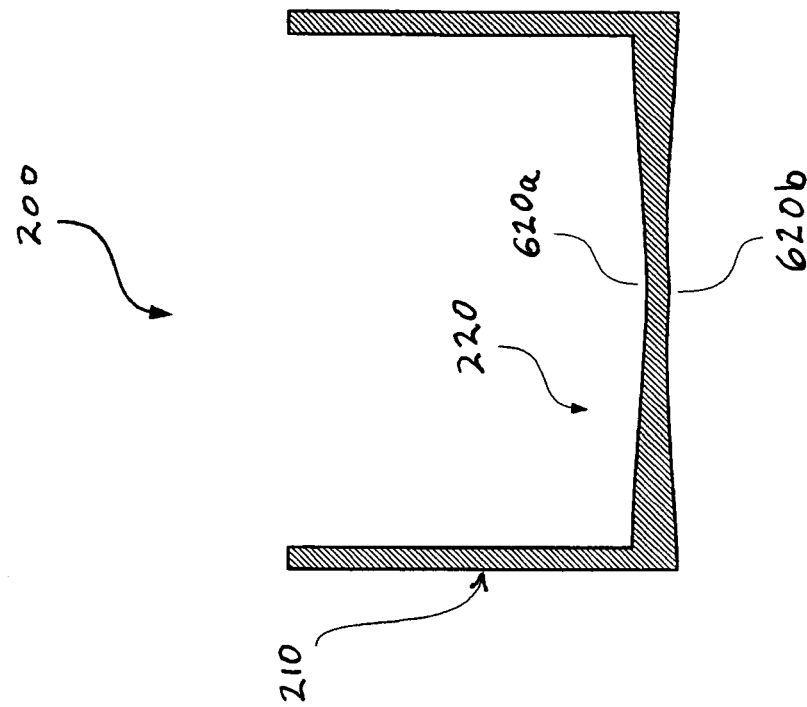
FIG. 6 is a cross-sectional elevation view of another embodiment of the invention.

In accordance with the present invention, FIG. 6 illustrates another embodiment of an improved article of cookware 200 that satisfies the need to have a stable article of cookware, yet minimize oil use and hence its consumption. The article has a substantially upright surrounding wall 210 connected to the bottom cooking surface 220 to form a fluid retaining vessel. The article 200 is optionally a pan or pot depending on the diameter of the bottom 220 relative to the height of sidewall 210. The article 200 has an inner bottom cooking surface 620a which receives foodstuffs, cooking oil and the like, whereas the outer bottom surface 620b rests on a table, heating element, burner grid and the like. As in the article of FIG. 2, outer bottom surface 620b is slightly concave with respect to the exterior. However, the inner cooking surface 620a is slightly concave with respect toe the interior region. Such an article of cookware is achieved through the processes described below in more detail with reference to FIG. 7. The slight inner concavity assure causes cooking oil to initially runs towards and pool in the center of the pan. This allows the cook to vary the quantity of oil used in proportional to the amount of food being cooked, rather than having to coat the entire inner cooking surface 620b. Thus, when the foodstuffs to be cooked when spread in a single layer will occupy less than the entire inner cooking surface 620b, the can be cooked primary in the center region which contains a smaller quantity of cooking oil or fat. The inner concave shape provides the cook with the option to push foodstuff articles toward the periphery of the inner cooking surface, as they cook such that any surface retained oil will drain toward the center of the pan away from the food, further limiting additional absorption of oil and fats by the cooked food stuffs.

Figure 7:
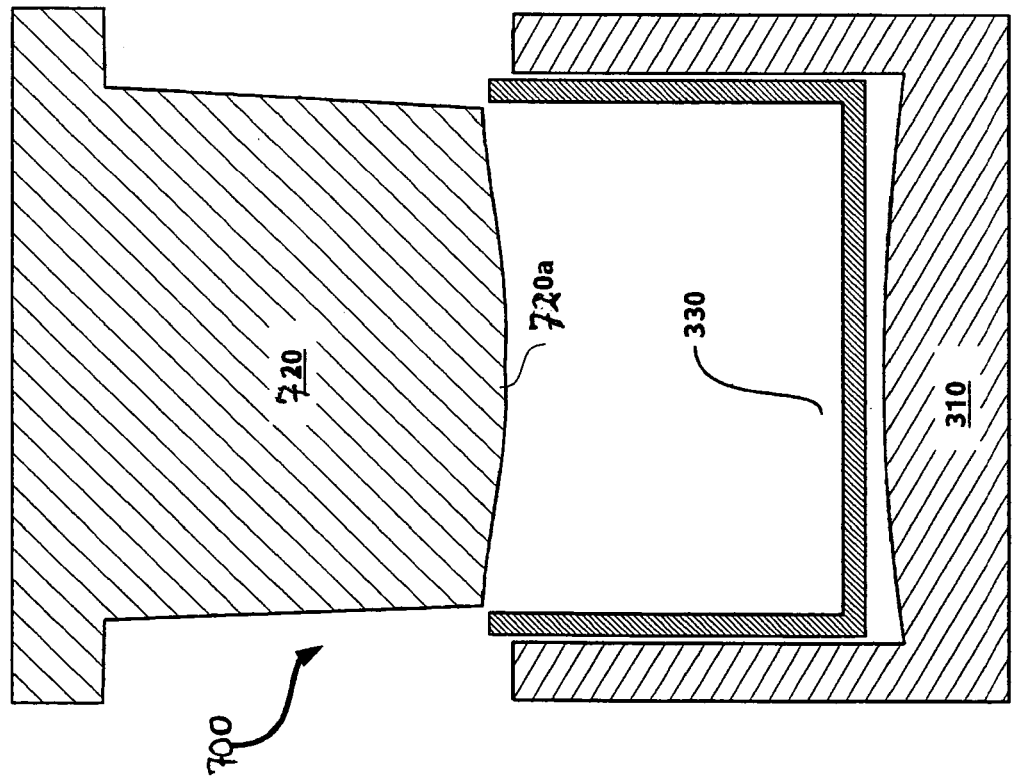
FIG. 7 is a cross-sectional elevation view of the tooling and work piece deployed to form the embodiment of FIG. 6.

FIG. 7 illustrates an embodiment of the method of forming an article of cookware 200, as shown in FIG. 6, using tooling system 700. As in the other embodiments of the method, the work piece 330 is a fluid retaining preform formed in the first step of the process.

The next step of the process uses an impact bonding press to impart the final shape to the pan. Thus, as shown in FIG. 7, preform work piece 330 is inserted between the upper tooling member 720 and a lower tooling member 310 of the impact press die. The upper portion exterior surface 310b of the lower tooling member 310 has a convex shape, and the lower interior surface 720a of the upper tooling member 720 also has a convex shape.

Thus, in the next step in the process, impacting the preform 330 between the dies upper and lower tooling members 320 and 310 impart the shape of the respective tooling member to the exterior and interior surface of the preform, as well as reshaping the contour of the upward extend walls, if desired. The exterior surface 720a of the upper tooling member 720 imparts the slightly concave interior shape to cookware article 200 in FIG. 6.

In other and alternative embodiments of the invention the sidewall and bottom surfaces of the preform, and hence completed article of cookware, may be formed of stainless steel, copper, aluminum, titanium and combinations thereof, including laminations of sheets of different and similar metals. Such laminations may be applied to the entire article of cookware, to form a clad cooking vessel, or to just the bottom surface of the cookware.

Further, the coin or medallion 240 need not be circular, however to the extent the process in FIG. 5 is deployed, the shape and dimension of the cutout 533 should substantially match that of medallion 240. Further, depending on the material selected for medallion 240, the printed information may be embossed from a complimentary pattern formed directly in the lower tooling member 310.In additional and preferred embodiments the medallion is titanium metal and the sidewall and bottoms of the cookware are aluminum. In more preferred embodiments of the invention, the medallion is titanium metal and sidewall and bottom of the cookware are anodized aluminum. As titanium is fairly resistant to corrosion in the highly acidic baths used to anodize aluminum, the anodizing process may be carried out after the forming processes described with respect to FIG. 3, 4, 5 and 7.

While the invention has been described in connection with a preferred embodiment, it is not intended to limit the scope of the invention to the particular form set forth, but on the contrary, it is intended to cover such alternatives, modifications, and equivalents as may be within the spirit and scope of the invention as defined by the appended claims.

The invention claimed is:

1. A process for forming an article of cookware, the process comprising the steps of:
   a) providing at least one substantially planar sheet comprising one or more layers of metal,
   b) deforming the metal sheet to form a preform having a bottom surface and surrounding sides extending upward therefrom to form a fluid containing vessel with an interior surface and an exterior surface, the bottom surface having a first diameter,
   c) introducing the preform in an impact bonding press having an interior surface die and an exterior surface die, the fluid retaining interior surface of the preform facing said interior surface die, wherein;
      i) the exterior surface die has a convex shape, and
      ii) the interior surface die has a shape that is selected from the group consisting of substantially planar and convex, d) providing a medallion having a second diameter substantially less than the first diameter between the bottom of the preform and the exterior surface die, e) impacting the preform between the interior and exterior dies to form a cooking vessel such that the contour of the interior surface die is imparted to the interior bottom surface of the cooking vessel and a slightly concave shape is imparted to the outside bottom surface of the preform as the medallion is embedded therein by said step of impacting.

2. The process of claim 1 wherein said step of providing the medallion occurs before said step of introducing the preform in an impact bonding press.

3. The process of claim 1 wherein at least one of the inner or outer layer of the preform is aluminum or an alloy thereof, an inner layer being disposed to form the interior surface of the preform and the outer surface being disposed to form the outer surface of the preform.

4. The process of claim 3 wherein the medallion comprises titanium metal or an alloy thereof.

5. The process of claim 4 further comprising the step of anodizing the article of cookware.

6. The process of claim 3 further comprising the step of anodizing the article of cookware.

7. The process of claim 1 wherein the medallion comprises titanium metal or an alloy thereof.

8. A process for forming an article of cookware according to claim 1 further comprising the step of forming a central cut-out in the exterior bottom surface of the preform, wherein the medallion is placed in the cut-out prior to said step of impact bonding so that the medallion is bonded to the exterior bottom surface of the article of cookware substantially filling the cut-out by said step of impacting.

9. The process of claim 8 wherein said step of providing the medallion occurs before said step of introducing the preform in an impact bonding press.

10. The process of claim 8 wherein at least one of the inner or outer layer of the preform is aluminum or an alloy thereof.

11. The process of claim 10 wherein the medallion comprises titanium metal or an alloy thereof.

12. The process of claim 11 further comprising the step of anodizing the article of cookware.

13. The process of claim 10 further comprising the step of anodizing the article of cookware.

14. The process of claim 8 wherein the medallion comprises titanium metal or an alloy thereof.

* * * * *